United States Patent

Nellums

[11] Patent Number: 5,425,437
[45] Date of Patent: Jun. 20, 1995

[54] SYNCHRONIZER WITH SELF-ENERGIZING

[75] Inventor: Richard A. Nellums, Farmington Hills, Mich.

[73] Assignee: Eaton Corporation, Cleveland, Ohio

[21] Appl. No.: 172,776

[22] Filed: Dec. 27, 1993

[51] Int. Cl.$^6$ ............................................. F16D 23/06
[52] U.S. Cl. ............................... 192/53 F; 192/53 G; 192/54
[58] Field of Search ...................... 192/53 F, 53 E, 54

[56] References Cited

U.S. PATENT DOCUMENTS

| | | | |
|---|---|---|---|
| 3,548,983 | 12/1970 | Hiraiwa | 192/53 |
| 4,573,371 | 3/1986 | Akutagawa | 192/53 F |
| 4,836,348 | 6/1989 | Knodel et al. | 192/53 F |
| 5,092,439 | 3/1992 | Reynolds | 192/53 |
| 5,097,930 | 3/1992 | Reynolds et al. | 192/53 F |
| 5,335,762 | 8/1994 | Raue | 192/53 F |

*Primary Examiner*—Andrea L. Pitts
*Attorney, Agent, or Firm*—Paul S. Rulon

[57] ABSTRACT

A baulkring-type synchronizer (18) includes cone clutch friction surfaces (24,48 and 26,50) and jaw clutch teeth (36b,28 and 36c,30) for frictionally synchronizing and positive connecting gears (14,16) to a shaft (12). A torque ring (63) is mounted in a shift sleeve (34) for limited rotation relative thereto and non-axial movement relative thereto. The ring defines self-energizing ramp surfaces (74a,74b,74c,74d), blocker surfaces (76a,76b,78a,78b), and reaction surfaces (76c,78c). The ring self-energizing ramp surfaces engage self-energizing ramp surfaces (70a,70b,72a,72b) defined on an outer circumference of a hub (32) affixed to the shaft. The ring blocker surfaces engage blocker surfaces (44a,44b,46a,46b) affixed to baulkrings (40,42). The ring reaction surfaces engage reaction surfaces (44c,44d,46c,46d) affixed to the baulkrings. Synchronizing torque produced by friction surfaces is partly reacted across the blocker surface, the remainder is reacted across the reaction surfaces, and the sum of the total synchronizing torque is reacted across the self-energizing ramp surfaces. A shift sleeve (34) is slidably splined to the hub (32) and is moved by an operator shift force ($F_o$) and an additive force ($F_a$) provided by the self-energizing ramp surfaces. Both forces ($F_o$ and $F_a$) react against the blocker teeth to engage the friction surfaces.

10 Claims, 3 Drawing Sheets

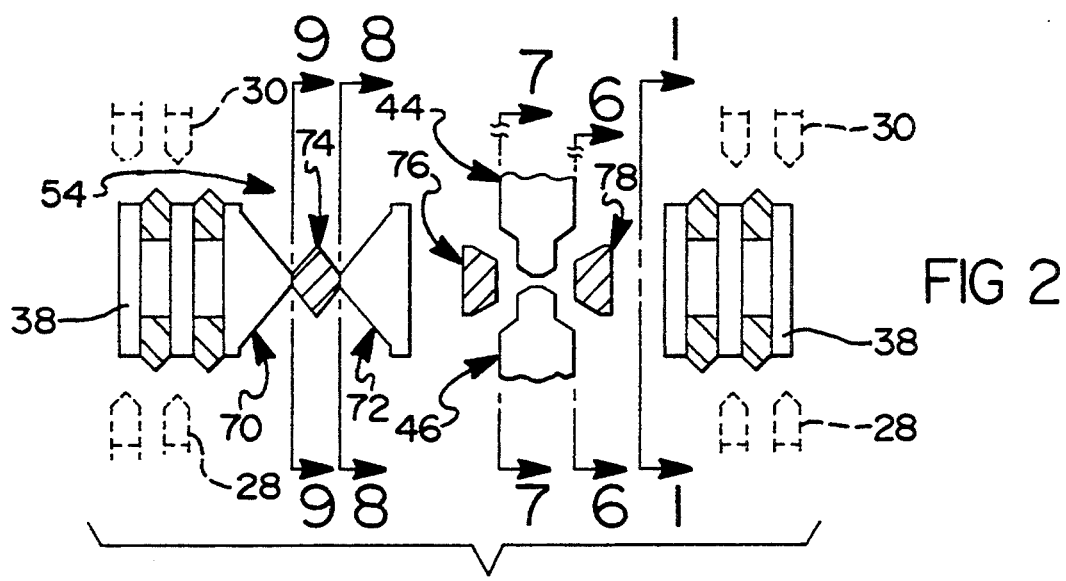
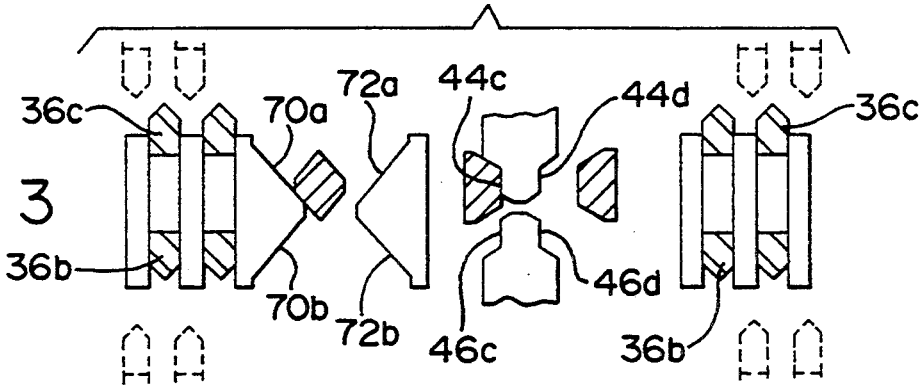
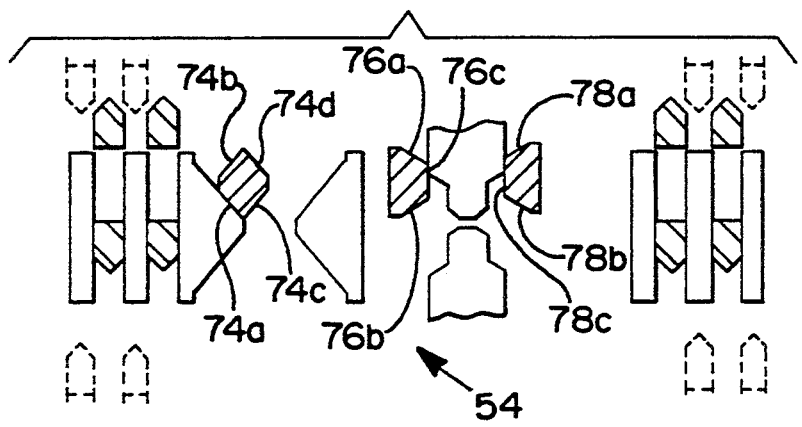
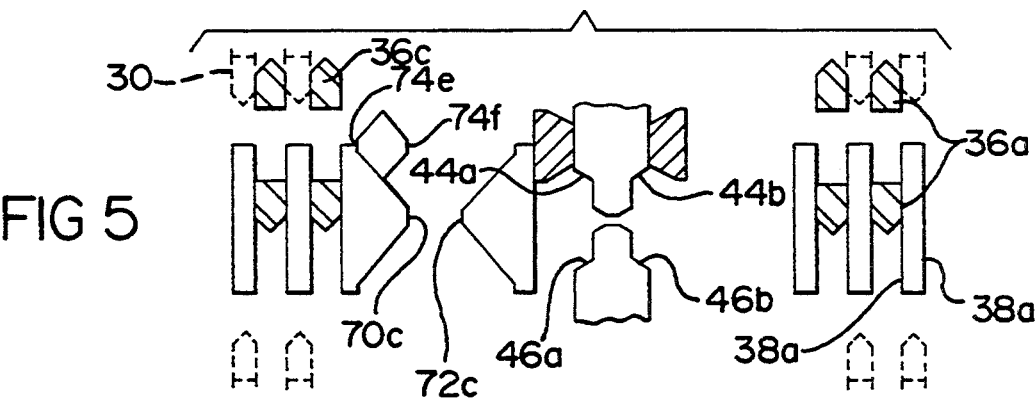

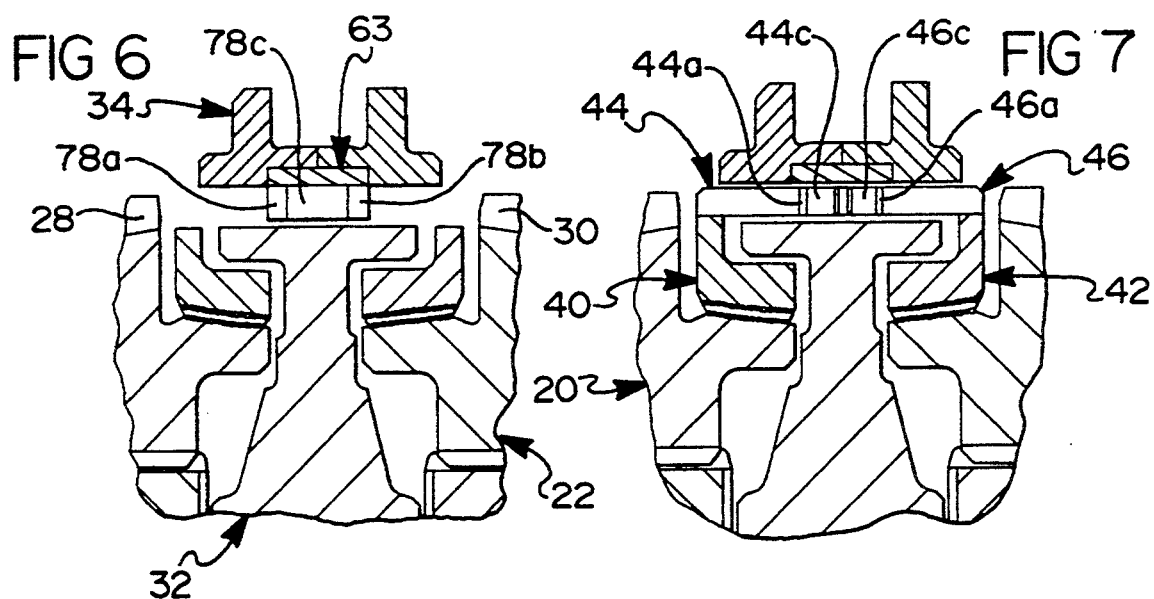
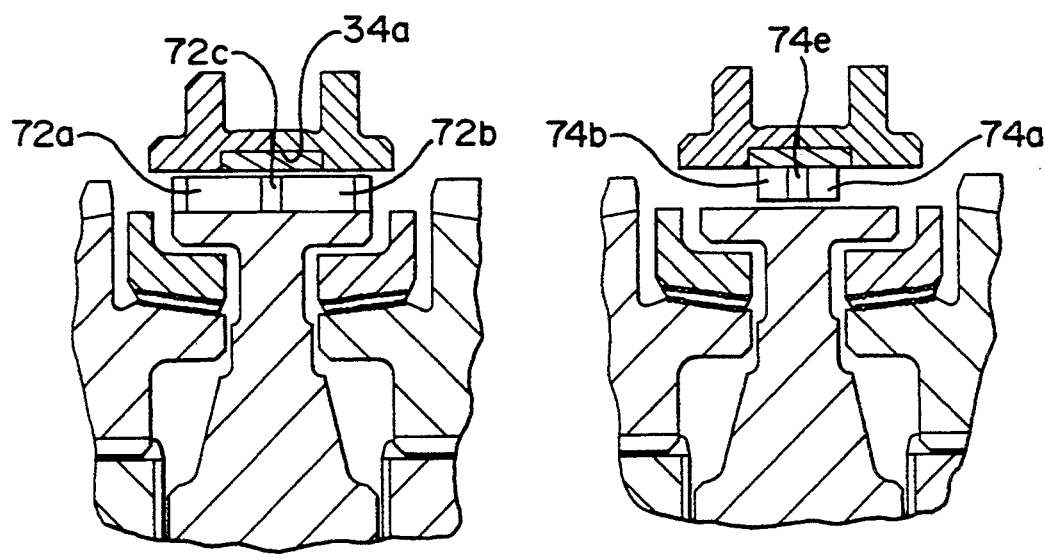
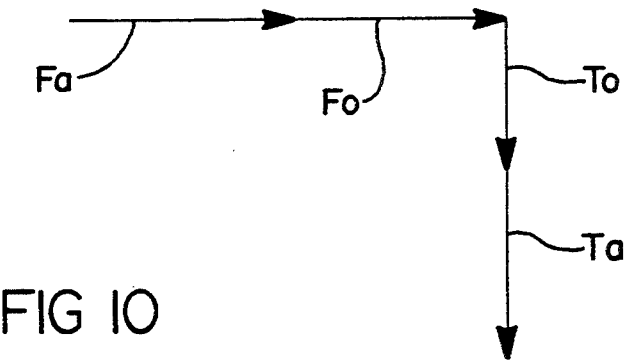

SYNCHRONIZER WITH SELF-ENERGIZING

FIELD OF THE INVENTION

This invention relates to a baulkring-type synchronizer having self-energizing.

BACKGROUND OF THE INVENTION

Baulkring-type synchronizer mechanisms for use in multi-ratio transmissions are well known. Such mechanisms include pairs of friction and jaw members for respectively synchronizing and positive clutching a gear to a shaft, pre-energizer assemblies for engaging the friction members in response to initial engaging movement of a shift sleeve, a hub rotatably fixed to the shaft and having external spline teeth slidably receiving internal spline teeth of the shift sleeve which often defines one of the jaw member pairs, a baulkring having blocker teeth for arresting engaging movement of the shift sleeve until synchronization is reached and for transferring a shift force from the sleeve to increase the engaging force of the friction members.

It is also known in the multiple ratio transmission art that synchronizer mechanisms may be used to reduce shift time of all or some of the transmission gear ratios. It is also known that the shift effort required by a vehicle operator, i.e., force applied to a shift lever, may be reduced by use of synchronizer mechanisms of the self-energizing type. Since operator shift effort generally increases with vehicle size and weight, synchronizer mechanisms of the self-energizing type are especially important for trucks, particularly for heavy duty trucks. A baulkring-type synchronizer of the self-energizing type may be seen by reference to U.S. Pat. 3,548,983, which is incorporated herein by reference. A pin-type synchronizer of the self-energizing type may also be seen by reference to U.S. Pat. 5,092,439, which is also incorporated herein by reference.

SUMMARY OF THE INVENTION

An object of this invention is to provide a baulkring-type synchronizer with improved self-energizing.

According to a feature of the invention, a clutch frictionally synchronizes and positive connects first and second drives disposed for relative rotation about a common axis. The clutch comprises first jaw means axially movable from a neutral position to an engaged position with second jaw means for positive connecting the drives in response to engaging movement of the first jaw means by an axially directed shift force $F_o$. The first jaw means includes a central opening having internal splines with axially extending flank surfaces slidably mating continuously with axially extending flank surfaces of external splines for preventing relative rotation between the internal and external splines. The external splines are affixed against rotation and axial movement relative to the first drive. A first friction surface is axially movable into engagement with a second friction surface in response to the engaging movement of the first jaw means for producing a synchronizing torque. First and second blocker means have angled surfaces movable into engagement in response to the engaging movement of the first jaw means for preventing asynchronous engagement of the jaw means, for transmitting the shift force ($F_o$) to the first friction surface to effect an engagement force of the friction surfaces, and for producing a torque counter to the synchronizing torque for moving the first and second blocker means out of engagement as synchronization is reached. First and second self-energizing means are operative when engaged to react the synchronizing torque for producing an additive axial force ($F_a$) in the direction of the shift force ($F_o$) for increasing the engagement force of the friction surfaces. The first and second self-energizing means include means for directing the additive axial force ($F_a$) to the first friction surface via the blocker means.

The clutch is characterized by a hub including an outer circumference defining the external splines. A baulkring includes the first friction surface and a plurality of second blocker surfaces defining the second blocker means. The first jaw means central opening and internal splines are defined by a shift sleeve. The shift sleeve has an annular radially inwardly opening groove. The first self-energizing means include a plurality of first self-energizing ramp surfaces defined in the hub outer circumference. A torque ring means is mounted in the sleeve groove for limited rotation relative thereto and for no-axial movement relative thereto. The ring means includes a plurality of circumferentially spaces apart first blocker projection extending radially inward therefrom and each defining one of the first blocker surfaces. The ring means also includes a plurality of circumferentially spaced apart self-energizing projections extending radially inward therefrom and each defining a second angled self-energizing ramp surface of the second self-energizing means. Engagement of the first and second self-energizing ramp surfaces reacts the synchronizing torque and transmits the additive axial force ($F_a$) to the blocker surfaces via the ring means.

BRIEF DESCRIPTION OF THE DRAWINGS

The synchronizer of the invention is shown in the accompanying drawings in which:

FIGS. 2-5 schematically illustrate blocking and self-energizing components in several stages of operation and looking along line 2—2 of Figure 1;

FIGS. 6-9 are partial views of the components in FIG. 2 and looking along lines 6—6, 7—7, 8—8 and 9—9 respectively; and FIG. 10 is a graphical representation of axial forces and torques acting across blocker surfaces of the synchronizer mechanism.

DETAILED DESCRIPTION OF THE DRAWINGS

Figure 1:
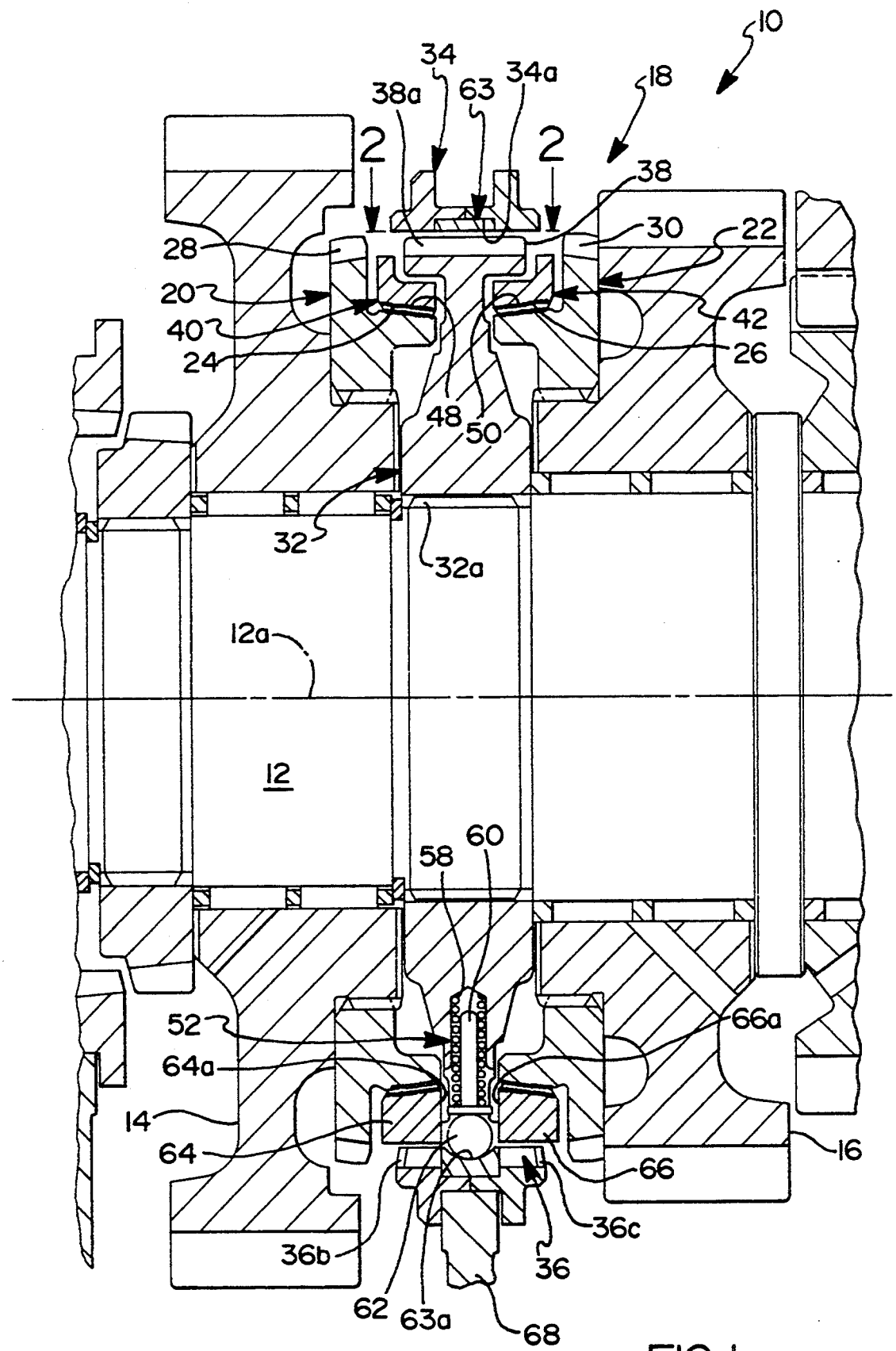
FIG. 1 a sectional view of a double-acting baulkring-type synchronizer in a neutral position and disposed for rotation about the axis of a shaft and looking along line 1—1 of FIG. 2.

The term "synchronizer clutch mechanism" shall designate a clutch mechanism utilized to non-rotatably couple a selected ratio gear to a shaft by means of a positive clutch in which attempted engagement of the positive clutch is prevented until members of the positive clutch are brought to substantially synchronous rotation by a synchronizing friction clutch associated with the positive clutch. The term "self-energizing" shall designate a synchronizer clutch mechanism which includes ramps or cams or the like to increase the engaging force of the synchronizing clutch in proportion to the synchronizing torque of the friction clutch.

Looking now at FIGS. 1-9, therein is shown a gear and synchronizer assembly 10 which forms part of a multi-ratio change speed transmission. Assembly 10 includes a shaft 12 mounted for rotation about a central axis 12a, axially spaced apart gears 14, 16 supported on the shaft for rotation relative thereto and secured against axial movement relative to the shaft in known manner, and a double-acting synchronizer clutch mechanism 18.

The synchronizer clutch mechanism 18 includes annular members 20,22 axially and rotatably affixed to gears 14,16 in known manner, gear friction surfaces 24,26 herein integral with members 20,22, gear jaw teeth 28,30 herein integral with members 20,22, a hub member 32 axially and rotatably affixed at a central opening 32a thereof to shaft 12, a shift sleeve 34, internal spline teeth 36 defined on a central opening of sleeve 34 and in constant mesh with external spline teeth 38 defined on the outer circumference of hub 32, baulkrings 40,42, blocker teeth sets 44,46 (FIGS. 2-7) and friction surfaces 48,50 herein integral with baulkrings 40,42, pre-energizer assemblies 52, and self-energizing/-blocker assemblies 54 (FIGS. 2-5, 8 and 9). Herein, the synchronizer includes three circumferentially spaced apart self-energizing/blocker assemblies 54 which cooperate with a like number of blocker teeth on each baulkring, and three circumferentially spaced apart pre-energizer assemblies. Each blocker tooth 44,46 respectively includes angled blocker surfaces 44a,44b,-46a,46b and synchronizing torque reaction surfaces 44c, 44d, 46c, 46d.

As is readily seen, friction surfaces 24,48 and 26,50 pair up to define friction clutches for synchronizing the gears to the shaft prior to engagement of the jaw clutch members. Cone clutches are preferred; however, other types of friction clutches may be used. A wide range of cone angles may be used. Cone angles of seven and one-half degrees are employed herein. The friction surfaces may be defined by any of several known friction materials affixed to the base member, e.g., pyrolytic carbon friction materials such as disclosed in U.S. Pat. Nos. 4,700,823; 4,844,218 and 4,778,548 may be used. These patents are incorporated herein by reference.

Spline teeth 36,38 have axially extending flank surfaces 36a,38a which continuously mate in close sliding relation so that there is relatively no free play between shift sleeve 34 and shaft 12. Opposite ends of splines 36 define jaw teeth 36b,36c which respectively mate with gear teeth 28,30 to positive clutch the gears to the shaft. The flank sides of jaw teeth 36b,36c and of gear jaw teeth 28,30 are provided with an antibackout or locking angle feature to prevent inadvertent disengagement of the teeth. Details of this feature may be seen by reference to U.S. Pat. No. 4,727,968 which is incorporated herein by reference. As may be seen in FIG. 5, when jaw teeth 36c and 30 are fully engaged there remains a substantial engaged length of flank surfaces 36a,38a to distribute forces from transmitted torque and thereby minimize wear.

Each pre-energizer assembly 52, which is known in the art, includes a helical compression spring 58 and plunger 60 disposed in a radially extending blind bore in hub 32 and biasing a roller or ball 62 (herein a roller) into a detent groove 63a in a torque ring 63 retained in an annular groove 34a in shift sleeve 34. The groove is sized to allow rotation of the ring relative to the sleeve and prevents relative axial movement. The ring may be formed of a single solid member, a single member having a small section removed, or of several segments, e.g., three segments disposed end-to-end and defining a ring of substantially 360 degrees. Pre-energizer assembly 52 resiliently positions roller 62 in the neutral position shown in Figures I and 2. Rollers 62 are axially spaced between abutment surfaces 64a,66a of a plurality of tabs 64,66 (herein three) formed integral with baulkrings 40,42.

When it is desired to couple either gear to the shaft, an appropriate and unshown shift mechanism, such as disclosed in U.S. Pat. No. 4,920,815 and incorporated herein by reference, moves shift sleeve 34 axially via a partially shown shift fork 68 along the axis of shaft 12 either left to couple gear 14 or right to couple gear 16. The shift mechanism may be manually moved by an operator through a linkage system, may be selectively moved by an actuator, or may be moved by means which automatically initiate shift mechanism movement and which also controls the magnitude of the force applied by the shift mechanism. When the shift mechanism is manually moved, pre-energizer assemblies apply a pre-energizer force proportional to the force applied by the operator to the shift sleeve. Whether manually or automatically applied, the force is applied to the shift sleeve in an axial direction and is proportional to the force $F_o$ in FIG. 10. The pre-energizer force, depending on direction of shift sleeve movement by the shift force ($F_o$), moves either friction surface 48 or 50 into initial engagement with its associated friction surface to clock the associated baulkring to a position relative to hub 32 for positioning the self-energizing/blocker assemblies 54 in a manner explained hereinafter.

Self-energizing/blocker assemblies 54 each comprise circumferentially spaced apart projections 70,72 extending radially outward from the outer circumference of hub 32 and including self-energizing or boost ramp surfaces 70a,70b,72a,72b extending oblique to the rotational plane of hub 32, a diamond shaped projection 74 extending radially inward from torque ring 63 and into the hourglass shaped recess defined by the boost ramps of projections 70,72, the blocker teeth 44,46, and circumferentially spaced apart blocker projections 76,78 having the blocker teeth reaction surfaces 44c,44d,46c,46d disposed therebetween. Projection 74 includes self-energizing or boost ramp surfaces 74a,74b,74c,74d respectively parallel to boost surfaces 70a,70b,72a,72b. Projections 76,78 respectively include blocker surfaces 76a,76b,78a,78b respectively parallel to blocker surfaces 44a,46a,44b,46b. Projections 76,78 also include reaction surfaces 76c,78c extending normal to the rotational plane of the hub and parallel to reaction surfaces 44c,44d,46c,46d. Projections 70,72 also include non-boost surfaces 70c,72c extending normal to the rotational plane and engagable with parallel non-boost surfaces 74e,74f when shift sleeve 34 is in the neutral position of FIGS. 1 and 2. The non-boost surfaces, when engaged, prevent unwanted activation of the self-energizing ramp surfaces in the event there is some amount of torque produced by one of the cone clutches, e.g., viscous shear of oil between the cone clutch friction surfaces may produce a torque that could otherwise activate the self-energizing ramp surfaces.

The following description of the self-energizing/-blocker assembly operation assumes an asynchronous condition exists between shaft 12 and gear 16 in a direction that engages the surfaces illustrated in FIGS. 2-5. Asynchronous conditions in the other direction or for gear 14 produce surface engagements that are believed to be obvious from the following description. FIG. 2 illustrates a "neutral position" of all synchronizer components. However, at the start of a shift blocker teeth 44,46 may be circumferentially positioned any place between blocker projections 76,78. Initial rightward axial movement of shift sleeve 34 by the operator shift force $F_o$ is transmitted by preenergizer rollers 62 to baulkring 42 via tab abutment surfaces 66a to effect initial frictional engagement of movable cone surface 50 with gear cone surface 26. The initial engagement force of the cone surface is, of course, a function of the force of spring 58 and the angles of the walls of detent grooves 63a.

FIG. 3 illustrates a "blocking/self-energizing position" wherein cone clutch torque due to pre-energizing has rotated baulkring 42 and torque ring 63 enough to engage blocker surfaces 44a,76a, self-energizing surfaces 70a,74a and reaction surfaces 44c,76c. When these surfaces are engaged, operator shift force $F_o$ applied to shift sleeve 34 is transmitted across blocker surfaces 76a,44a, thereby engaging friction surfaces 26,50 with force $F_o$ for producing a synchronizing torque $T_o$. The angle of the blocker surfaces produce an unblocking torque counter to and less than the synchronizing torque $T_o$. The difference between the unblocking torque and synchronizing torque $T_o$ is reacted across reaction surfaces 44c,76c. Since the blocker and reaction surfaces are rigid with self-energizing projection 74, all of the synchronizing torque is reacted across self-energizing ramp surfaces 74a,70a. The sum of the torques reacting across surfaces 74a,70a produce an axial force component or axial additive force $F_a$ acting in the same direction as operator shift force $F_o$. Force $F_a$ is also transmitted across the engaged blocker surfaces, thereby further increasing the engaging force of the cone friction surfaces to provide an additive synchronizing torque $T_a$ which adds to torque $T_o$. As substantial synchronism is reached, the synchronizing torque drops below the unblocking torque, whereby the blocker teeth move out of engagement to allow continued axial movement of shift sleeve 34 and engagement of movable jaw teeth 36 with gear teeth 30.

FIG. 10 graphically illustrates the sum of the axial forces $F_o$ plus $F_a$ engaging the clutch friction surfaces and the sum of the synchronizing torques $T_o$ plus $T_a$, produced by the clutch friction surfaces. For a given operator shift force $F_o$ and an operator synchronizing torque $T_o$, the magnitude of the axial additive force is preferably a function of the angle of the engaged self-energizing ramp surfaces. This angle is preferably great enough to produce an additive force $F_a$ of magnitude sufficient to increase synchronizing torque and decrease synchronizing time in response to a given moderate shift effort by the operator. However, this angle is also preferably low enough to produce a controlled axial additive force $F_a$, i.e., the force $F_a$ should increase or decrease in response to the force $F_o$ increasing or decreasing. If the ramp angle is too great, the ramps are self-locking rather than self-energizing; hence, once initial engagement of the cone clutch is effected, the force $Fa$ will rapidly and uncontrollably increase independent of the force $F_o$, thereby driving the cone clutch toward lockup. Self-locking rather than self-energizing decreases shift quality or shift feel, may over stress synchronizer components, may cause over heating and rapid wear of the cone clutch surfaces, and may even override operator movement of the shift lever. If no additive axial force is preferred for an up or downshift of a gear, the ramp surfaces for the up or downshift may be made parallel to the splines. For example, if ramp surface 70b,74a are made parallel to splines 38, no additive force $F_a$ is provided (for a shift in that direction).

Cone clutch torque provided by the force $F_o$ may be expressed by the following equation:

$$T_o = F_o R_c \mu_c / \sin \alpha$$

where:

$R_c$ = the mean radius of the cone friction surface,
$\mu_c$ = the coefficient of friction of the cone friction surface, and
$\alpha$ = the angle of the cone friction surfaces.

The main variables for calculating self-energizing ramp angles and for providing additive axial forces $F_a$, which increase or decrease in proportion to operator forces $F_o$, are cone clutch angle, cone clutch coefficient of friction, mean radii ratio of the cone clutch and of the self-energizing ramps, and ramp coefficient of friction. Further details for calculating and controlling self-energizing or boost forces may be obtained by reference to U.S. Pat. 5,092,439 which is incorporated herein by reference.

FIG. 4 illustrates a "boosted/unblocked position" which occurs immediately after unblocking torque has separated the blocking surfaces. Self-energizing which occurs in this position may be due to inertia of baulkring 42 and/or while there is less than complete disengagement of the cone clutch. This self-energizing phenomenon provides an axial assist force acting on shift sleeve 34 in the direction of shift force $F_o$. The assist force helps to restart axial engaging movement of jaw teeth 36c toward engagement with jaw teeth 30 as unblocking occurs and helps move the jaw teeth into engagement when the V-shaped ends of teeth 36c and 30 engage. The assist force lessens what is known as shift notchiness by decreasing the need for the operator to move the shift lever with extra effort to finish a shift as unblocking occurs, i.e., the assist force facilitates smooth and relatively effortless completion of shifts. FIG. 5 illustrates a full "engaged position" of jaw teeth 36c,30.

An embodiment of a synchronizer mechanism with self-energizing has been disclosed. Many variations and modifications of the embodiment are believed to be within the spirit of the invention. The following claims are intended to cover the inventive portions of disclosed mechanism and variations and modifications believed to be within the spirit of the invention.

What is claimed is:

1. A clutch for frictionally synchronizing and positive connecting first and second drives disposed for relative rotation about a common axis; the clutch including:

first jaw means axially movable from a neutral position to an engaged position with second jaw means for positive connecting the drives in response to engaging movement of first jaw means by an axially directed shift force ($F_o$), the first jaw means including a central opening having internal splines with axially extending flank surfaces slidably mating continuously with axially extending flank surfaces of external splines for preventing relative rotation between the internal and external splines, and the external splines affixed against rotation and axial movement relative to the first drive;

a first friction surface axially movable into engagement with a second friction surface in response to the engaging movement of the first jaw means for producing a synchronizing torque ($T_o$);

first and second angled blocker surfaces movable into engagement in response to the engaging movement of the first jaw means for preventing asynchronous engagement of the jaw means, for transmitting the shift force ($F_o$) to the first friction surface to effect an engagement force of the friction surfaces, and for producing a torque counter to the synchronizing torque for moving the first and second blocker surfaces out of engagement as synchronization is reached;

first and second self-energizing means operative when engaged to react to the synchronizing torque for producing an additive axial force ($F_a$) in the direction of the shift force ($F_o$) for increasing the engagement force of the friction surfaces, the first and second self-energizing means including means for directing the additive axial force ($F_a$) to the first friction surface via the blocker surfaces; characterized by:

a hub including an outer circumference defining the external splines;

a first baulkring including the first friction surface and a plurality of the second blocker surfaces, the baulkring being axially movable away from the hub toward the second friction surface;

the first jaw means central opening and internal splines defined by a shift sleeve, the sleeve having an annular radially inwardly opening groove;

the first self-energizing means including a plurality of first self-energizing ramp surfaces defined in the hub outer circumference; and torque ring means mounted in the sleeve groove for limited rotation relative thereto and for non-axial movement relative thereto, the ring means including a plurality of circumferentially spaced apart first blocker projections extending radially inward therefrom and each defining one of the first blocker surfaces and including a plurality of circumferentially spaced apart self-energizing projections extending radially inward therefrom and each defining a second angled self-energizing ramp surface of the second self-energizing means, engagement of the first and second self-energizing ramp surfaces reacting the synchronizing torque and transmitting the additive axial force ($F_a$) to the blocker surfaces via the ring means.

2. The clutch of claim 1, further including a third drive disposed for rotation about the common axis relative to the first and second drives and axially spaced from the second drive;

the shift sleeve internal splines defining a third jaw means axially movable from the neutral position into an engaged position with a fourth jaw means for positively connecting the first and third drives in response to engaging movement of the shift sleeve by a second shift force ($F_o$) directed axially opposite the first shift force ($F_o$);

a second baulkring including a third friction surface and a plurality of fourth blocker surfaces, the baulkring being axially movable away from the hub toward a fourth friction surface;

the first self-energizing means including a plurality of third self-energizing ramp surfaces defined in the hub outer circumference;

each blocker projection defining a third blocker surface engagable with one of the fourth blocker surfaces in response to engaging movement of the third jaw means for preventing asynchronous engagement of the third and fourth jaw means, for transmitting the shift force ($F_o$) to the third friction surface to effect an engagement force of the third and fourth friction surfaces and for producing a torque counter to the synchronizing torque for moving the third and fourth blocker surfaces out of engagement as synchronization is reached; and each self-energizing projection defining a fourth self-energizing ramp surface engagable with one of the third self-energizing surfaces in response to the synchronizing torque for producing an additive axial force ($Fa$) transmitted to the third friction surface via the third and fourth blocker surfaces.

3. The clutch of claim 2, wherein:
the first through fourth blocker surfaces and first through fourth self-energizing ramp surfaces effect synchronizing of the second and third drives with the first drive when asynchronous rotation of the first drive is initially in one direction.

4. The clutch of claim 3, wherein:
the torque ring means includes a plurality of circumferentially spaced apart second blocker projections extending radially inward therefrom and each defining a blocker surface engagable with additional blocker surfaces of the first and second baulkring in response to asynchronous rotation of the first drive initially being opposite the one direction.

5. The clutch of claim 1, wherein:
the first baulkring including a first reaction surface associated with each second blocker surface and positioned normal to a plane normal to the axis; and
each projection means extending radially inward from the sleeve includes a second reaction surface associated with the first blocker and positioned parallel to first reaction surface, the first and second reaction surfaces operative when engaged to react to the friction surface torque not reacted by the first and second blocker surfaces, and engagement of the first and second self-energizing ramp surfaces operative to react to the total torque acting on the reaction surfaces and the blocker surfaces.

6. The clutch of claim 1, wherein:
the torque ring means comprises at least three arcuate segments disposed end-to-end and defining a ring of substantially three hundred and sixty degrees.

7. A clutch for frictionally synchronizing and positive connecting first and second drives disposed for relative rotation about a common axis; the clutch including:

first jaw means axially movable from a neutral position to an engaged position with second jaw means for positively connecting the drives in response to engaging movement of first jaw means by an axially directed shift force ($F_o$), the first jaw means including a central opening having internal splines with axially extending flank surfaces slidably mating continuously with axially extending flank surfaces of external splines for preventing relative rotation between the internal and external splines, and the external splines affixed against rotation and axial movement relative to the first drive;

a first friction surface axially movable into engagement with a second friction surface in response to the engaging movement of the first jaw means for producing a synchronizing torque ($T_o$);

first and second angled blocker surfaces movable into engagement in response to the engaging movement of the first jaw means for preventing asynchronous engagement of the jaw means, for transmitting the shift force ($F_o$) to the first friction surface to effect an engagement force of the friction surfaces, and for producing a torque counter to the synchronizing torque for moving the first and second blocker surfaces out of engagement as synchronization is reached; first and second self-energizing means operative when engaged to react the synchronizing torque for producing an additive axial force ($F_a$) in the direction of the shift force ($F_o$) for increasing the engagement force of the friction surfaces, the first and second self-energizing means including means for directing the additive axial force ($F_a$) to the first friction surface via the blocker surfaces; characterized by:

a hub including an outer circumference defining the external splines;

a first baulkring including the first friction surface and a plurality of the second blocker surfaces, the baulkring being axially movable away from the hub toward the second friction surface, and the baulkring including a first reaction surface associated with each second blocker surface and positioned normal to a plane normal to the axis;

the first jaw means central opening and internal splines defined by a shift sleeve;

the first self-energizing means including a plurality of first self-energizing ramp surfaces defined in the hub outer circumference;

a plurality of circumferentially spaced apart rigid projection means mounted on the sleeve for limited rotation and non-axial movement relative thereto and extending radially inward from the sleeve, each projection means defining a second angled self-energizing ramp surface of the second self-energizing means and one of the first blocker surfaces and a second reaction surface associated with the first blocker surface and positioned parallel to the first reaction surface, the first and second reaction surfaces operative when engaged to react friction surface torque not reacted by the first and second blocker surfaces, and engagement of the first and second self-energizing ramp surfaces operative to react the total torque acting on reaction surfaces and the blocker surfaces.

8. The clutch of claim 7, further including a third drive (14) disposed for rotation about the common axis relative to the first and second drives and axially spaced from the second drive;

the shift sleeve internal splines defining a third jaw means axially movable from the neutral position into an engaged position with a fourth jaw means for positive connecting the first and third drives in response to engaging movement of the shift sleeve by a second shift force ($F_o$) directed axially opposite the first shift force ($F_o$);

a second baulkring including the third friction surface and a plurality of the fourth blocker surfaces, the baulkring being axially movable away from the hub toward a fourth friction surface, and the baulkring including a third reaction surface associated with each fourth blocker surface and positioned normal to the plane;

the first self-energizing means including a plurality of third self-energizing ramp surfaces defined in the hub outer circumference; and each circumferentially spaced apart rigid projection means defining a fourth angled self-energizing ramp surface of the second self-energizing means, a third blocker surface and a fourth reaction surface associated with the third blocker surface and positioned parallel to the first reaction surface, the third and fourth reaction surfaces operative when engaged to react to the friction surface torque not reacted to by the third and fourth blocker surfaces, and engagement of the third and fourth self-energizing ramp surfaces operative to react to the total torque acting on the engaged reaction surfaces and the blocker surfaces.

9. The clutch of claim 8, wherein:

the first through fourth blocker surfaces and first through fourth self-energizing ramp surfaces effect synchronizing of the second and third drives with the first drive when asynchronous rotation of the first drive is initially in one direction.

10. The clutch of claim 1, wherein the first blocker projections are circumferentially spaced from the self-energizing projections.

* * * * *